United States Patent Office  3,274,180
Patented Sept. 20, 1966

3,274,180
METHOD OF PREPARING PREGNAPENTAENES
Milton David Heller, New City, N.Y., Robert Herman Lenhard, Ridgefield Park, N.J., and Seymour Bernstein, New City, N.Y., assignors to American Cyanamid Company, Stamford, Conn., a corporation of Maine
No Drawing. Filed July 15, 1964, Ser. No. 382,936
20 Claims. (Cl. 260—239.55)

This application is a continuation-in-part of our copending application Serial Nos. 320,546, now abandoned; 320,559, now Patent No. 3,182,057; 320,499, now Patent No. 3,182,075; and 320,540, now abandoned, all filed October 31, 1963.

This invention relates to a new method of preparing aromatic steroids. More particularly it relates to a new method of preparing steroids having aromatic rings A and B.

The novel method of preparing steroids of the present invention may be illustrated by the following equation:

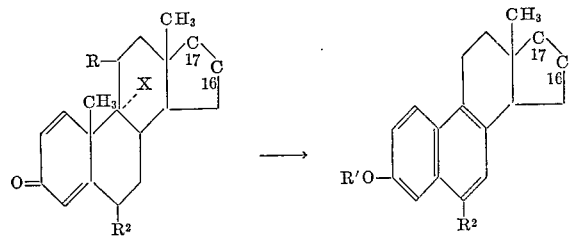

wherein R is selected from the group consisting of hydroxyl and chlorine, R' is selected from the group consisting of hydrogen and lower alkanoyl, R² is hydrogen, methyl, fluoromethyl, difluoromethyl trifluoromethyl and fluorine, X is selected from the group consisting of chlorine and bromine and

is selected from the group consisting of

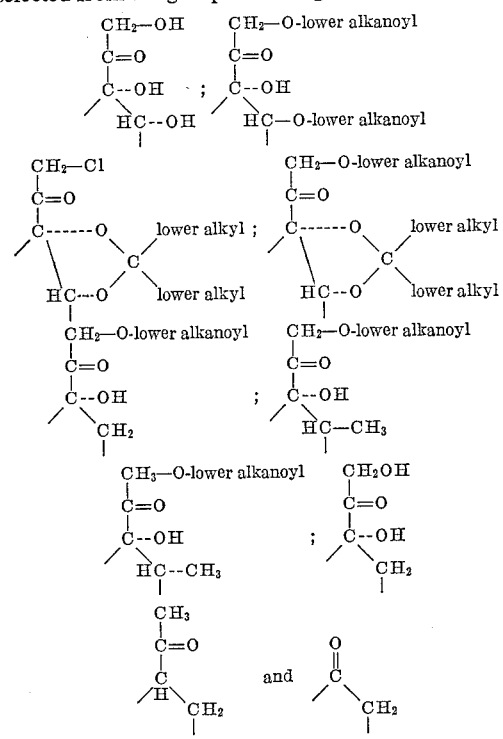

The steroids of the present invention are substantially insoluble in water and somewhat soluble in the usual organic solvents.

The specific intermediates found useful in the process of this invention include;

16α,21-diacetoxy-9α-chloro-11β-hydroxy-17α-hydroxypregna-1,4-diene-3,20-dione;
21-acetoxy-9α-chloro-11β-hydroxy-16α,17α-isopropylidenedioxypregna-1,4-diene-3,20-dione;
9α-chloro-11β,21-dihydroxy-16α,17α-isopropylidenedioxypregna-1,4-diene-3,20-dione;
21-acetoxy-9α-bromo-11β,17α-dihydroxy-6α-methylpregna-1,4-diene-3,20-dione;
21-acetoxy-9α-bromo-11β,17α-dihydroxy-6α-fluoropregna-1,4-diene-3,20-dione;
21-acetoxy-16α-methyl-9α-bromo-11β,17α-dihydroxypregna-1,4-diene-3,20-dione;
21-acetoxy-9α-bromo-11β,17α-dihydroxy-16β-methylpregna-1,4-diene-3,20-dione;
16α,21-diacetoxy-9α,11β-dichloro-17α-hydroxypregna-1,4-diene-3,20-dione;
21-acetoxy-9α,11β-dichloro-16α,17α,isopropylidenedioxypregna-1,4-diene-3,20-dione;
9α-11β-dichloro-21-hydroxy-16α,17α-isopropylidenedioxypregna-1,4-diene-3,20-dione;
21-acetoxy-9α-11β-dichloro-6α-fluoromethyl-16α,17α-isopropylidenedioxypregna-1,4-diene-3,20-dione;
21-acetoxy-9α,11β-dichloro-6α-difluoromethyl-16α,17α-isopropylidenedioxypregna-1,4-diene-3,20-dione;
21-acetoxy-16α,17α-isopropylidenedioxy-9α,11β-dichloropregna-1,4-diene-3,20-dione;
21-methanesulfonyloxy-9α-11β-dichloro-16α,17α-isopropylidenedioxy-pregna-1,4-diene-3,20-dione;
21-acetoxy-9α,11β-dichloro-17α-hydroxypregna-1,4-diene-3,20-dione;
21-acetoxy-9α,11β-dichloro-17α-hydroxy-16α-methylpregna-1,4-diene-3,20-dione;
21-acetoxy-9α,11β-dichloro-17α-hydroxy-16β-methylpregna-1,4-diene-3,20-dione;
21-acetoxy-9α,11β-dichloro-17α-hydroxy-6α-methylpregna-1,4-diene-3,20-dione;
21-acetoxy-9α,11β-dichloro-6α-monofluoromethyl-17α-hydroxypregna-1,4-diene-3,20-dione;
21-acetoxy-9α,11β-dichloro-6α-difluoromethyl-17α-hydroxypregna-1,4-diene-3,20-dione;
21-propionoxy-9α,11β-dichloro-6α-trifluoromethyl-17α-hydroxypregna-1,4-diene-3,20-dione;
9α,11β-dichloropregna-1,4-diene-3,20-dione;
21-acetoxy-9α,11β-dichloro-6α-fluoro-17α-hydroxypregna-1,4-diene-3,20-dione;
9α,11β-dichloro-6α-fluoropregna-1,4-diene-3,20-dione;
21-hydroxy-9α,11β-dichloro-17α-hydroxypregna-1,4-diene-3,20-dione;
21-hydroxy-9α,11β-dichloropregna-1,4-diene-3,20-dione;
9α,11β-dichloro-androsta-1,4-diene-3,17-dione;
9α-bromo-11β-chloro-androsta-1,4-diene-3,17-dione;
and the like.

The process of the present invention is carried out by contacting the starting material with a weak base. The weak base may be for example dimethylformamide, pyridine, collidine, lutidine, diethylpyridine and the like. The temperature of the reaction may vary from about 15° C. to about 160° C. The time for completing the reaction will depend on the temperature used and may vary from about one-half hour to about 72 hours. After completion of the reaction, the desired steroids may be recovered by methods well known in the steroid art.

The compounds prepared by the process of the present invention are active in reducing cholesterol and therefore have utility as hypocholesteremic agents. The resulting compounds also have no appreciable activity as estrogens. This lack of estrogenic activity makes them useful as hypocholesteremic agents without the undesirable estrogenic feminizing side-effects.

The following examples illustrate in detail the preparation of representative steroids of the present invention.

*Example 1.—21-acetoxy-9α-chloro-11β-hydroxy-16α,17α-isopropylidene-dioxypregna-1,4-diene-3,20-dione*

A stirred suspension of 4.35 g. of 9α-chloro-11β,16α,17α,21-tetrahydroxypregna-1,4-diene-3,20-dione [J. Am. Chem. Soc., 81, 1689 (1959)] in 435 ml. of acetone is treated with 0.44 ml. of 70–72% perchloric acid. The reaction mixture is stirred at room temperature for 1.5 hours and then 6 ml. of saturated sodium bicarbonate solution and 100 ml. of water is added. After concentration under reduced pressure, 400 ml. of saturated saline solution is added and the cooled mixture is filtered and washed with water to give 4.60 g. of product, melting point 275–279° C., dec. Recrystallization from acetone-methanol-ethyl acetate gives 3.57 g. of 9α-chloro-11β-21-dihydroxy - 16α,17α-isopropylidenedioxypregna-1,4-diene-3,20-dione, melting point 281.5–283.5° C., dec.

A solution of 1.14 g. of 9α-chloro-11β,21-dihydroxy-16α,17α - isopropylidenedioxypregna-1,4-diene-3,20-dione in 10 ml. of pyridine and 5 ml. of acetic anhydride is allowed to stand at room temperature for 68 hours. The reaction mixture is poured into ice-water and the product is filtered and washed with water. Recrystallization from acetone-hexane gives 21-acetoxy-9α-chloro-11β-hydroxy-16α,17α - isopropylidenedioxypregna-1,4-diene-3,20-dione, melting point 247–249° C., the product of this example.

*Example 2.—21-acetoxy-3-hydroxy-16α,17α-isopropylidenedioxy-19-norpregna-1,3,5(10),6,8-pentaen-20-one*

A solution of 0.50 g. of 21-acetoxy-9α-chloro-11β-hydroxy - 16α,17α-isopropylidenedioxypregna-1,4-diene-3,20-dione in 25 ml. of dimethylformamide is heated under reflux for 22.5 hours. The reaction mixture is evaporated under reduced pressure, the residue is dissolved in a small amount of acetone and the crude product precipitated by the addition of water. The crude product is dissolved in methylene chloride and adsorbed on a synthetic magnesium silicate column. Elution with 4% acetone-hexane gives 0.19 g. of 21-acetoxy-3-hydroxy-16α,17α-isopropylidenedioxy-19-norpregna-1,3,5(10),6,8-pentaen-20-one, $\lambda_{max.}^{MeOH}$ 230 mμ (ε65,800)

*Example 3.—3,21-diacetoxy-16α,17α-isopropylidenedioxy-19-norpregna-1,3,5(10),6,8-pentaen-20-one*

A solution of 0.19 g. of 21-acetoxy-3-hydroxy-16α,17α-isopropylidenedioxy - 19-norpregna-1,3,5(10),6,8-pentaen-20-one in 4 ml. of pyridine and 2 ml. of acetic anhydride is allowed to stand at room temperature for 64 hours. The reaction mixture is poured into ice-water and the resultant solid filtered and washed with water to give 0.19 g. of product. Recrystallization from acetone-hexane gives 0.13 g. of pure 3,21-diacetoxy-16α,17α-isopropylidenedioxy - 19 - norpregna-1,3,5(10),6,8-pentaen-20-one, melting point 222.5–225.5° C., $\lambda_{max.}^{MeOH}$ 230 mμ (ε77,000)

[α]$_D$ +107° (chloroform)

*Example 4.—3,21-diacetoxy-17α-hydroxy-19-norpregna-1,3,5(10),6,8-pentaen-20-one*

A solution of 1.0 g. of 21-acetoxy-9α-bromo-11β,17α-dihydroxypregna-1,4-diene-3,20-dione in 50 ml. of dimethylformamide is heated under reflux for 0.5 hour. The reaction mixture is evaporated under reduced pressure and the residue is dissolved in 10 ml. of pyridine and 5 ml. of acetic anhydride. After standing at room temperature overnight, methanol and benzene are added and the reaction mixture is evaporated under reduced pressure. The resultant residue is dissolved in methylene chloride and adsorbed on a synthetic magnesium silicate column. Elution with 8% acetone-hexane gives 0.20 g. of product. Recrystallization from acetone-hexane gives 0.15 g. of pure 3,21-diacetoxy-17α-hydroxy-19-norpregna-1,3,5(10),6,8-pentaen-20-one, melting point 184.5–186° C.

In this example, use of 21-acetoxy-9α-chloro-11β,17α-dihydroxypregna-1,4-diene-3,20-dione [J. Am. Chem. Soc., 77, 4181 (1955)] in place of the 9α-bromo compound gives the product of the example. However, a reflux time of 22.5 hours is required.

*Example 5.—16α,21-diacetoxy-3,17α-dihydroxy-19-norpregna-1,3,5(10),6,8-pentaen-20-one*

A solution of 16α,21-diacetoxy-9α-bromo-11β,17α-dihydroxypregna-1,4-diene-3,20-dione (1.0 g.) [J. Am. Chem. Soc., 81, 1689 (1959)] in dimethylformamide (50 ml.) is refluxed one-half hour. The solvent is removed in vacuo and the resultant oil is chromatographed on a synthetic magnesium silicate to give 16α,21-diacetoxy-3,17α,dihydroxy-19-norpregna-1,3,5(10),6,8-pentaen-20-one.

*Example 6.—21-acetoxy-3,17α-dihydroxy-16β-methyl-19-norpregna-1,3,5(10),6,8-pentaen-20-one*

A solution of 21-acetoxy-9α-bromo-11β,17α-dihydroxy-16β-methylpregna-1,4-diene-3,20-dione (1.0 g.) [J. Am. Chem. Soc., 80, 6687 (1958); J. Chem. Soc., 4560 (1961)] in dimethylformamide (50 ml.) is refluxed one-half hour. The solvent is removed in vacuo and the resultant oil is chromatographed on a synthetic magnesium silicate to give 21-acetoxy-3,17α-dihydroxy-16β-methyl-19-norpregna-1,3,5(10),6,8-pentaen-20-one.

*Example 7.—21-acetoxy-3,17α-dihydroxy-16α-methyl-19-norpregna-1,3,5(10),6,8-pentaen-20-one*

A solution of 21-acetoxy-9α-bromo-11β,17α-dihydroxy-16α-methylpregna-1,4-diene-3,20-dione (1.0 g.) [J. Am. Chem. Soc., 80, 4431 (1958)] in dimethylformamide (50 ml.) is refluxed one-half hour. The solvent is removed in vacuo and water is added. The resultant oil is worked with a glass rod until a solid results. Chromatography of the solid on a synthetic magnesium silicate gives 21 - acetoxy - 3,17α-dihydroxy-16α-methyl-19-norpregna-1,3,5(10),6,8-pentaen-20-one.

*Example 8.—21-acetoxy-6-fluoro-3,17α-dihydroxy-19-norpregna-1,3,5(10),6,8-pentaen-20-one*

A solution of 21-acetoxy-9α-bromo-6α-fluoro-11β,17α-dihydroxypregna-1,4-diene-3,20-dione (1.0 g.) [United States Patent 2,838,499 (June 10, 1958)] in dimethylformamide (50 ml.) is refluxed one-half hour. The solvent is removed in vacuo and water is added. The resultant oil is worked with a glass rod until a solid results. Chromatography of the solid on a synthetic magnesium silicate gives 21-acetoxy-6-fluoro-3,17α-dihydroxy-19-norpregna-1,3,5(10),6,8-pentaen-20-one.

*Example 9.—21-acetoxy-3,17α-dihydroxy-6-methyl-19-norpregna-1,3,5(10),6,8-pentaen-20-one*

A solution of 21-acetoxy-9α-bromo-11β,17α-dihydroxy-6α-methylpregna-1,4-diene-3,20-dione (1.0 g.) [J. Am. Chem. Soc., 79, 1515 (1957)] in dimethylformamide (50 ml.) is refluxed one-half hour. The solvent is removed under reduced pressure and water is added. The resultant oil is worked with a glass rod until a solid results. Chromatography of the solid on a synthetic magnesium silicator gives 21-acetoxy-3,17α-dihydroxy-6-methyl-19-norpregna-1,3,5(10),6,8-pentaen-20-one.

*Example 10.—Preparation of 9α,11β-dichloro-16α,17α-isopropylidenedioxy - 21 - methanesulfonyloxypregna-1,4-diene-3,20-dione*

A solution of 9α,11β-dichloro-21-hydroxy-16α,17α-isopropylidenedioxypregna-1,4-diene-3,20-dione (0.72 g.) [Steroids, 1, 331 (1963)] in cold pyridine (7 ml.) is treated with methanesulfonyl chloride (0.15 ml.) and allowed to stand at −5° C. for 16.5 hours. The reaction mixture is then poured into ice water and the resultant precipitate (0.75 g., melting point 212°–214° C., dec.) is filtered and washed well with water. Crystallization from acetone-hexane gives the product of the example (0.65 g., melting point 223.5°–226° C., dec.). A portion of the latter is crystallized three more times from the same solvents to give melting point 232–234° C., dec.

*Example 11.—Preparation of 21-chloro-3-hydroxy-16α, 17α - isopropylidenedioxy - 19 - norpregna-1,3,5(10),6, 8-pentaen-20-one*

A solution of 9α,11β-dichloro-16α,17α-isopropylidenedioxy - 21 - methanesulfonyloxypregna-1,4-diene-3,20-dione (0.50 g.) and lithium chloride (0.14 g.) in dimethylformamide (25 ml.) is heated under reflux for 0.5 hour. The yellow solution is concentrated under reduced pressure to near dryness, water is added and the product is filtered and washed with water to give an amorphous yellow solid (0.38 g.), melting point 90°–150° C. The product is soluble in 10% sodium hydroxide solution and exhibited an equilenin-type absorption in the ultraviolet. A portion (0.365 g.) is dissolved in benzene (ca. 10 ml.) and adsorbed on a synthetic magnesium silicate (14.5 g.) column. Elution with 3% acetone-petroleum ether (boiling point 60–70°) gives the product of the example (0.264 g.); $\lambda_{max}$ 231 mμ ($\epsilon$68,900), 269 mμ ($\epsilon$6570), 281 mμ ($\epsilon$6570), 293 mμ ($\epsilon$4800), 328 mμ ($\epsilon$3200) and 342 mμ ($\epsilon$3200). The product, obtained as a white amorphous solid, is apparently labile to air or light. A solution of the product (0.13 g.) in pyridine (2 ml.) and acetic anhydride (1 ml.) is allowed to stand at room temperature for 19 hours. The solution is poured into ice water, the precipitate is filtered and washed with water to give (0.127 g.) of product, melting point 200°–203.5° C. Two crystallizations from acetone-hexane gives the analytical sample (0.109 g.) of 3-acetoxy-21-chloro - 16α,17α - isopropylidenedioxy - 19-norpregna-1,3, 5(10),6,8-pentaen-20-one, melting point 205°–207° C.

*Example 12.—Preparation of 16α,21-diacetoxy-3,17α-dihydroxy-19-norpregna-1,3,5(10)-6,8-pentaen-20-one*

One gram of 16α,21-diacetoxy-9α,11β-dichloro-17α-hydroxypregna-1,4-diene-3,20-dione [Steroids, 1, 331 (1963)] in 50 ml. of dimethylformamide is reacted and worked up in the manner described in Example 2 above. The crude product is isolated, chromatographed, and crystallized from acetone-hexane to give 16α,21-diacetoxy-3,17α - dihydroxy - 19 - norpregna-1,3,5(10),6,8-pentaen-20-one.

Saponification of the product of the example with potassium carbonate in methanol followed by acidification gives 3,16α,17α,21-tetrahydroxy-19-norpregna-1,3,5(10), 6,8-pentaen-20-one.

*Example 13.—Preparation of 21-acetoxy-3-hydroxy-16α, 17α - isopropylidenedioxy - 19 - norpregna-1,3,5(10), 6,8-pentaen-20-one*

One gram of 21-acetoxy-9α,11β-dichloro-16α,17α-isopropylidenedioxypregna-1,4-diene-3,20-dione [Steroids, 1, 331 (1963)] in 50 ml. of dimethylformamide is reacted and worked up essentially in the manner of Example 2 above. The crude product is isolated, chromatographed, and crystallized from acetone-hexane to give 21-acetoxy-3 - hydroxy - 16α,17α - isopropylidenedioxy - 19 - norpregna-1,3,5(10),6,8-pentaen-20-one.

Saponification of the product of the example with potassium carbonate in methanol at room temperature followed by acidification gives 3,21-dihydroxy-16α,17α-isopropylidenedioxy - 19 - norpregna - 1,3,5(10),6,8-pentaen-20-one.

*Example 14.—Preparation of 21-acetoxy-6-fluoromethyl-3 - hydroxy - 16α,17α - isopropylidenedioxy - 19 - norpregna-1,3,5(10),6,8-pentaen-20-one*

Following essentially the procedure of Example 11, the steroid 21 - acetoxy - 9α,11β - dichloro - 6α - fluoromethyl - 16α,17α - isopropylidenedioxypregna - 1,4 - diene-3,20-dione (U.S. Patent 3,038,898) on being heated in dimethylformamide is converted into the product of the Example.

*Example 15.—Preparation of 21 - acetoxy - 6 - difluoromethyl - 3 - hydroxy - 16α,17α - isopropylidenedioxy-19-norpregna-1,3,5(10),6,8-pentaen-20-one*

Following essentially the procedure of Example 11, the steroid 21 - acetoxy - 9α,11β - dichloro - 6α - difluoromethyl - 16α,17α - isopropylidenedioxypregna - 1,4 - diene-3,20-dione (U.S. Patent 3,038,898) on being heated in dimethylformamide is converted into the product of the example.

*Example 16.—Preparation of 21-acetoxy-6-trifluoromethyl - 3-hydroxy - 16α,17α - isopropylidenedioxy - 19-norpregna-1,3,5(10),6,8-pentaen-20-one*

Following essentially the procedure of Example 11, the steroid 21 - acetoxy - 9α,11β - dichloro - 6α - trifluoromethyl - 16α,17α - isopropylidenedioxypregna - 1,4 - diene-3,20-dione (U.S. Patent 3,038,898) on being heated in dimethylformamide is converted into the product of the example.

*Example 17.—Preparation of 21 - acetoxy - 3,17α - dihydroxy - 19 - norpregna - 1,3,5(10),6,8 - pentaen - 20-one*

A. A solution of 21 - acetoxy - 9α,11β - dichloro - 17α-hydroxypregna - 1,4 - diene - 3,20 - dione (1.01 g.) (U.S. Patent 2,894,963) and lithium chloride (0.285 g.) in dimethylformamide (50 ml.) is reacted and worked up as in the preparation of IIa above to give 0.82 g. of solid. This is triturated with warm ether and filtered. The filtrate is evaporated to a glass, methanol is added and the resultant crystalline solid is filtered and washed with methanol to give the product of the example (0.207 g.), melting point 196.5°–198.5° C. One additional crystallization from acetone-hexane does not appreciably alter the melting point, 197°–199° C.

B. A solution of 21 - acetoxy - 9α,11β - dichloro - 17α-hydroxypregna-1,4-diene-3,20-dione (2.0 g.) and lithium chloride (0.56 g.) in dimethylformamide (100 ml.) is reacted and worked up in the usual manner to give 1.50 g. of solid, melting point 95°–155° C. A portion (1.3 g.) in pyridine (10 ml.) and acetic anhydride (5 ml.) is allowed to stand at room temperature overnight. After the addition of methanol and benzene the reaction mixture is evaporated under reduced pressure to dryness. The residue (1.35 g.) is dissolved in methylene chloride (15 ml.) and adsorbed on a synthetic-magnesium silicate (90 g.) column. Elution with 7% acetone-hexane (13 x 100 ml. fractions) yields the 3,21-diacetate (0.34 g.), melting point 180°–183° C. after crystallization from acetone-hexane. Three additional crystallizations from the same solvent pair gives the analytical sample (0.27 g.) of 3,21 - diacetoxy - 17α - hydroxy - 19 - norpregna-1,3,5(10),6,8-pentaen-20-one, melting point 184°–186° C.

C. A solution of 21 - acetoxy - 9α,11β - dichloro - 17α-hydroxypregna - 1,4 - diene - 3,20 - dione (1.0 g.) in pyridine (50 ml.) is heated under reflux for 22.5 hours. The reaction mixture is evaporated under reduced pressure to a glass which is dissolved in a small amount of acetone. The addition of a large volume of water together with scratching with a glass rod precipitates 0.77 g. of solid. Trituration of the solid with warm ether is followed by filtration. The ether filtrate is evaporated to a glass. Crystallization of the residue from methanol gives 21 - acetoxy - 3,17α - dihydroxy - 19 - norpregna-1,3,5(10),6,8-pentaen-20-one (0.24 g.) melting point 193°–196° C. which on recrystallization is raised to 197°–199° C.

D. A solution of 21 - acetoxy - 9α,11β - dichloro - 17α-hydroxypregna-1,4-diene-3,20-dione (50 mg.) in dimethylformamide is refluxed 30 minutes. The solution is concentrated to near dryness, water is added and the resultant viscous oil is worked with a glass rod until a solid is formed. Filtration gives material (30 mg.) with the identical ultraviolet and infrared spectra to the above samples of 21 - acetoxy - 3,17α - dihydroxy - 19 - norpregna-1,3,5(10),6,8-pentaen-20-one.

*Example 18.—Preparation of 3,17α,21 - trihydroxy-19-norpregna-1,3,5(10),6,8-pentaen-20-one*

A solution of 21 - acetoxy - 3,17α - dihydroxy - 19-norpregna - 1,3,5(10),6,8 - pentaen - 20 - one (0.15 g.) in methanol (30 ml.) is treated with 10% aqueous potassium carbonate solution (1.5 ml.) while under an atmosphere of argon. After 30 minutes at room temperature, glacial acetic acid (0.12 ml.) is added and the reaction mixture is evaporated under reduced pressure. The residue is heated with acetone and the insoluble potassium acetate is removed by filtration. Concentration of the filtrate with simultaneous addition of hexane gives the product of the example (0.10 g.), melting point 240°–244° C. Two further crystallizations from acetone-hexane gives the analytical sample (0.07 g.), melting point 245°–249° C.

*Example 19.—Preparation of 19-norpregna-1,3,5(10),6,8-pentaen-3,17α,20,21-tetrol*

A solution of 3,17α,21 - trihydroxy - 19 - norpregna-1,3,5(10),6,8-pentaen-20-one (0.024 g.) and sodium borohydride (0.024 g.) in absolute ethanol (2 ml.) and one drop of water is allowed to stand at room temperature for one hour. It is then neutralized with dilute sulfuric acid, diluted with water and extracted with ethyl acetate. The extract is washed with saturated saline, dried over magnesium sulfate and evaporated under reduced pressure to give crude 19 - norpregna-1,3,5(10),6,8-pentaen-3,17α,20,21-tetrol (0.019 g.), melting point 208°–214° C. with previous softening.

*Example 20.—Preparation of 21-acetoxy-3,17α-dihydroxy-16α-methyl-19-norpregna-1,3,5(10),6,8-pentaen-20-one*

A solution of 1.0 g. of 21-acetoxy-9α,11β-dichloro-17α-hydroxy-16α-methylpregna-1,4 - diene - 3,20 - dione (U.S. Patent No. 2,894,963) in 50 ml. of dimethylformamide is reacted and worked up as described in Example 17D above. The crude product is isolated, chromatographed and crystallized from acetone-hexane to give 21-acetoxy-3,17α - dihydroxy-16α-methyl-19-norpregna-1,3,5(10),6,8-pentaen-20-one.

*Example 21.—Preparation of 21-acetoxy-3,17α-dihydroxy-16β-methyl-19-norpregna-1,3,5(10),6,8-pentaen-20-one*

A solution of 1.0 g. of 21-acetoxy-9α,11β-dichloro-17α-hydroxy-16β-methylpregna-1,4 - diene - 3,20 - dione (U.S. Patent No. 2,894,963) in 50 ml. of dimethylformamide is reacted and worked up as described in Example 17D above. The crude product is isolated, chromatographed, and crystallized from acetone-hexane to give 21-acetoxy-3,17α - dihydroxy-16β-methyl-19-norpregna-1,3,5(10),6,8-pentaen-20-one.

*Example 22.—Preparation of 21-acetoxy-3,17α-dihydroxy-6-methyl-19-norpregna-1,3,5(10),6,8-pentaen-20-one*

One gram of 21-acetoxy-9α,11β-dichloro-17α-hydroxy-6α-methylpregna-1,4-diene-3,20-dione (U.S. Patent No. 2,894,963) in 50 ml. of dimethylformamide is reacted and worked up in the manner of Example 17D above. The crude product is isolated, chromatographed and crystallized from acetone-hexane to give 21-acetoxy-3,17α-dihydroxy - 6-methyl-19-norpregna-1,3,5(10)6,8-pentaen-20-one.

*Example 23.—Preparation of 21-acetoxy-6-monofluoromethyl - 3,17α - dihydroxy-19-norpregna-1,3,5(10),6,8-pentaen-20-one*

Following the procedure described in Example 17D 21 - acetoxy - 9α,11β-dichloro-6α-monofluoromethyl-17α-hydroxypregna-1,4-diene-3,20-dione (U.S. Patent No. 3,038,898) is converted into the product of the example by heating with dimethylformamide.

*Example 24.—Preparation of 21-acetoxy-6-difluoromethyl-3,17α-dihydroxy-19-norpregna-1,3,5(10),6,8-pentaen-20-one*

Following the procedure of Example 17D 21-acetoxy-9α,11β - dichloro - 6α-difluoromethyl-17α-hydroxypregna-1,4-diene-3,20-dione (U.S. Patent No. 3,038,898) is converted into the product of the example by heating with dimethylformamide.

*Example 25.—Preparation of 21-propionoxy-6-trifluoromethyl - 3,17α - dihydroxy-19-norpregna-1,3,5(10),6,8-pentaen-20-one*

Following the procedure described in Example 17D 21 - propionoxy - 9α,11β-dichloro-6α-trifluoromethyl-17α-hydroxy-pregna-1,4-diene-3,20-dione (U.S. Patent No. 3,038,898) is converted into the product of the example by heating with dimethylformamide.

*Example 26.—Preparation of 3-hydroxy-19-norpregna-1,3,5(10),6,8-pentaen-20-one*

Using the procedure of Example 17D 9α,11β-dichloro pregna-1,4-diene-3,20-dione [J. Am. Chem. Soc., 82, 2308 (1960)] is converted into the product of the example by heating with dimethylformamide.

*Example 27.—Preparation of 21-acetoxy-9α,11β-dichloro-6α-fluoro-17α-hydroxypregna-1,4-diene-3,20-dione*

A stirred solution of 0.25 g. of 21-acetoxy-6α-fluoro-17α-hydroxypregna-1,4,9(11)-triene - 3,20 - dione (U.S. Patent No. 2,838,499) and 1.0 g. of lithium chloride in 10 ml. of glacial acetic acid is cooled to 5°–10° C. and is treated with 0.091 g. of N-chlorosuccinimide followed by 0.25 ml. of a saturated solution of anhydrous hydrogen chloride in tetrahydrofuran. After stirring at room temperature for 3 hours, the reaction mixture is poured into ice-water and the crude product is filtered and washed with water. The moist solid is dissolved in methylene chloride, dried over anhydrous magnesium sulfate and evaporated under reduced pressure to give 0.27 g. of the product of this example. Recrystallization from methylene chloride-methanol gives the pure 21-acetoxy-9α-11β-dichloro - 6α - fluoro-17α-hydroxypregna-1,4-diene-3,20-dione; M.P. 248°–250° C. dec.; [α]$_D^{25}$ +121° (pyridine);

$$\lambda_{max.}^{MeOH}\ 234\ m\mu\ (\epsilon15,500)$$

*Example 28.—Preparation of 21-acetoxy-6-fluoro-3,17α-dihydroxy-19-norpregna-1,3,5(10),6,8-pentaen-20-one*

A solution of 1.0 g. of 21-acetoxy-9α,11β-dichloro-6α-fluoro-17α-hydroxypregna-1,4-diene-3,20-dione in 50 ml. of dimethylformamide is heated under reflux for 30 minutes. The yellow-orange solution is evaporated under reduced pressure to dryness, water is added and the resulant oil is scratched with a glass rod to afford 0.756 g. of solid. Trituration of the solid with warm ether is followed by filtration. The ether filtrate is evaporated to a glass (0.476 g.) which is dissolved in methylene chloride and adsorbed on a synthetic magnesium silicate column. Elution with 10% acetone-hexane gives 0.107 g. of 21-acetoxy-6-fluoro-3,17α-dihydroxy-19-norpregna-1,3,5(10),6,8-pentaen-20-one.

*Example 29.—Preparation of 3,21-diacetoxy-6-fluoro-17α-hydroxy-19-norpregna-1,3,5(10),6,8-pentaen-20-one*

A solution of 0.107 g. of 21-acetoxy-6-fluoro-3,17α-dihydroxy-19-norpregna-1,3,5(10),6,8-pentaen-20-one in 2 ml. of pyridine and 1 ml. of acetic anhydride is allowed to stand at room temperature overnight. The addition of ice-water followed by filtration affords 0.10 g. of solid which is dissolved in methylene chloride and chromatographed on a synthetic magnesium silicate. Elution with 7% acetone-hexane gives 0.077 g. of product. Recrystallization from acetone-hexane affords pure 3,21-diacetoxy-6 - fluoro - 17α-hydroxy-19-norpregna-1,3,5(10),6,8-pentaen-20-one; melting point 203°–205.5° C.

*Example 30.—Preparation of 6-fluoro-3-hydroxy-19-norpregna-1,3,5(10),6,8-pentaen-20-one*

A. One gram of 9α,11β-dichloro-6α-fluoropregna-1,4-diene-3,20-dione (U.S. Patent No. 3,009,930) in 50 ml. of dimethylformamide is reacted and worked up in the manner of Example 12 above. The crude product is isolated, chromatographed, and crystallized from acetone-hexane to give 6-fluoro-3-hydroxy-19-norpregna-1,3,5(10),6,8-pentaen-20-one.

B. One gram of 9α,11β-dichloro-6β-fluoro-pregna-1,4-diene-3,20-dione (U.S. Patent No. 3,009,930) in 50 ml. of dimethylformamide is reacted and worked up as described in Example 28 above. The product obtained is identical with that obtained in Example 30A above, namely, 6-fluoro-3-hydroxy-19 - norpregna - 1,3,5(10),6,8 - pentaen-20-one.

*Example 31.—Preparation of 3-hydroxyestra-1,3,5(10),6,8-pentaen-17-one (equilenin)*

A solution of 9α,11β-dichloroandrosta-1,4-diene-3,17-dione (0.200 g.) [J. Am. Chem. Soc., 81, 2191 (1959)] and lithium chloride (0.06 g.) in dimethylformamide (10 ml.) is heated under reflux for 30 minutes. The reaction mixture is concentrated under reduced pressure to near dryness, water is added and the resultant viscous oil is converted to a tan solid by scratching with a glass rod. The solid is filtered and washed with water to give 0.117 g., melting point 140°–220° C. (red melt). This material is dissolved in methylene chloride (ca. 10 ml.) and adsorbed on a synthetic magnesium silicate (12 g.) column. Elution with 5% acetone-petroleum ether (boiling point 60°–70° C.) (10 x 15 ml. fractions) gives, in the initial 200 ml. of eluate, equilenin (0.024 g.) as indicated by infrared spectral and thin-layer chromatographic analyses. Crystallization from acetone-hexane gives 0.017 g. of equilenin melting point 239°–245° C., red melt. The remaining 300 ml. of eluate on evaporation yields 0.088 g. of a mixture of equilenin and one or more by-products as indicated by infrared and thin-layer chromatographic analyses. The mixture is combined with the evaporated mother liquor above and chromatographed on diatomaceous earth using a solvent system consisting of n-heptane saturated with methanol. The solid (0.037 g.) obtained on evaporation of holdback volume 5 through 6.5 is crystallized from acetone-hexane to give an additional 0.020 g. of equilenin, melting point 242.5°–250° C. the latter is combined with the fraction obtained from the adsorption chromatography above and is recrystallized from the same solvent pair to give 0.024 g., melting point 244.5°–250° C. One additional crystallization from ethanol-water gives 0.015 g. of equilenin, melting point 246.5°–250° C., $$\lambda^{\text{MeOH}}_{\text{max.}} \ 230 \ m\mu \ (\epsilon 60{,}400)$$

269 mμ (ε4790), 280 mμ (ε5550), 292 mμ (ε3720), 327 mμ (ε2290) and 339 mμ (ε2560);

νKBr 3285, 1722, 1627 and 1602 cm.⁻¹, [α]D +89° Max.

(dioxane)

In the above experiment lithium chloride can be omitted and the product, equilenin, is obtained in a comparable yield.

*Example 32.—Preparation of 3-hydroxyestra-1,3,5(10),6,8-pentaen-17-one*

A solution of 9α-bromo-11β-chloroandrosta-1,4-diene-3,17-dione (0.200 g.) [J. Am. Chem. Soc., 81, 2191 (1959)] in dimethylformamide (10 ml.) is heated under reflux for 30 minutes. The desired equilenin is isolated by chromatography in a manner similar to that described in Example 31.

We claim:
1. A method of preparing compounds of the formula:

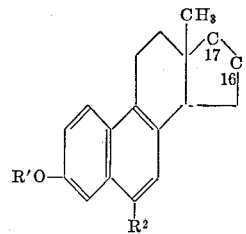

wherein R' is selected from the group consisting of hydrogen and lower alkanoyl, R² is hydrogen, methyl, fluoromethyl, difluoromethyl, trifluoromethyl or fluorine and

is selected from the group consisting of

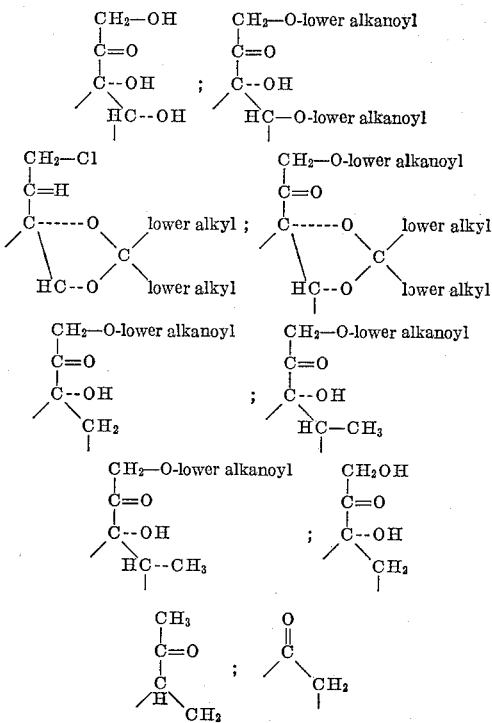

which comprises contacting a steroid of the formula:

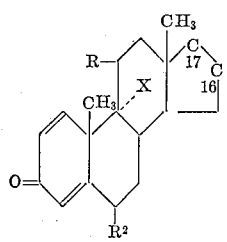

wherein R₂ and

is as defined above and X is selected from the group consisting of chlorine and bromine and R is selected from the group consisting of hydroxyl and chlorine, with a weak base at a temperature within the range of about 15° C. to about 160° C. and recovering said product therefrom.

2. A method of preparing 16α,21-dilower alkanoyloxy-3,17α-dihydroxy-19 - norpregna - 1,3,5(10),6,8 - pentaen-20-one which comprises contacting 16α,21-dilower alkanoyloxy-9α-chloro-11β,17α - dihydroxy - pregna - 1,4 - diene-3,20-dione with dimethylformamide at a temperature within the range of about 15° C. to about 160° C. and recovering said compound therefrom.

3. A method of preparing 21-acetoxy-3-hydroxy-16α, 17α - isopropylidenedioxy - 19 - norpregna - 1,3,5(10),6,8-pentaen-20-one which comprises contacting 21-acetoxy-9α-chloro - 11β - hydroxy - 16α,17α - isopropylidenedioxy-pregna-1,4-diene-3,20-dione with dimethylformamide at a temperature within the range of about 15° C. to about 160° C. and recovering said compound therefrom.

4. A method of preparing 3,12-diacetoxy-17α-hydroxy-19-norpregna-1,3,5(10),6,8-pentaen-20-one which comprises contacting 21 - acetoxy - 9α-bromo-11β,17α-dihydroxypregna - 1,4 - diene-3,20-dione with dimethylformamide at a temperature within the range of about 15° C. to about 160° C., subsequently treating with pyridine and acetic anhydride and recovering said compound therefrom.

5. A method of preparing 16α,21-diacetoxy-3,17α-dihydroxy - 19 - norpregna - 1,3,5(10),6,8-pentaen-20-one which comprises contacting 16α,21-diacetoxy-9α-bromo-11β,17α-dihydroxypregna-1,4-diene-3,20-dione with dimethylformamide at a temperature within the range of about 15° C. to about 160° C. and recovering said compound therefrom.

6. A method of preparing 21-acetoxy-3,17α-dihydroxy-16β - methyl-19-norpregna-1,3,5(10),6,8-pentaen-20-one which comprises contacting 21-acetoxy-9α-bromo-11β, 17α - dihydroxy - 16β-methylpregna-1,4-diene-3,20-dione with dimethylformamide at a temperature within the range of about 15° C. to about 160° C. and recovering said compound therefrom.

7. A method of preparing 21-acetoxy-3,17α-dihydroxy-16α - methyl - 19-norpregna-1,3,5(10),6,8-pentaen-20-one which comprises contacting 21-acetoxy-9α-bromo-11β, 17α - dihydroxy - 16α-methylpregna-1,4-diene-3,20-dione with dimethylformamide at a temperature within the range of about 15° C. to about 160° C. and recovering said compound therefrom.

8. A method of preparing 21-acetoxy-6-fluoro-3,17α-dihydroxy - 19 - norpregna-1,3,5(10),6,8-pentaen-20-one which comprises contacting 21-acetoxy-9α-bromo-6α-fluoro - 11β,17α - dihydroxy-pregna-1,4-diene-3,20-dione with dimethylformamide at a temperature within the range of about 15° C. to about 160° C. and recovering said compound therefrom.

9. A method of preparing 21-acetoxy-3,17α-dihydroxy-6 - methyl - 19 - norpregna-1,3,5(10),6,8-pentaen-20-one which comprises contacting 21-acetoxy-9α-bromo-11β, 17α-dihydroxy-6α-methylpregna-1,4-diene-3,20-dione with dimethylformamide at a temperature within the range of about 15° C. to about 160° C. and recovering said compound therefrom.

10. A method of preparing 16α,21-diacetoxy-3,17α-dihydroxy - 19 - norpregna-1,3,5(10),6,8-pentaen-20-one which comprises contacting 16α,21-diacetoxy-9α,11β-dichloro-17α-hydroxypregna-1,4-diene-3,20-dione with dimethylformamide at a temperature within the range of about 15° C. to about 160° C. and recovering said compound therefrom.

11. A method of preparing 21-acetoxy-3-hydroxy-16α,17α - isopropylidenedioxy-19-norpregna-1,3,5(10),6, 8-pentaen-20-one which comprises contacting 21-acetoxy-9α,11β - dichloro-16α,17α-isopropylidenedioxypregna-1,4-diene-3,20-dione with dimethylformamide at a temperature within the range of about 15° C. to about 160° C. and recovering said compound therefrom.

12. A method of preparing 21-chloro-3-hydroxy-16α, 17α - isopropylidenedioxy - 19 - norpregna-1,3,5(10),6,8-pentaen-20-one which comprises contacting 9α,11β-dichloro - 21 - hydroxy-16α,17α-isopropylidenedioxypregna-1,4-diene-3,20-dione with methanesulfonyl chloride and subsequently with dimethylformamide at a temperature within the range of about 15° C. to about 160° C. and recovering said compound therefrom.

13. A method of preparing 21-acetoxy-6-fluoromethyl-3 - hydroxy - 16α,17α-isopropylidenedioxy-19-norpregna-1,3,5(10),6,8-pentaen-20-one which comprises contacting 21 - acetoxy - 9α,11β - dichloro-6α-fluoromethyl-16α,17α-isopropylidenedioxypregna-1,4-diene-3,20-dione with dimethylformamide at a temperature within the range of about 15° C. to about 160° C. and recovering said compound therefrom.

14. A method of preparing 21-acetoxy-3,17α-dihydroxy-19-norpregna-1,3,5(10),6,8-pentaen-20-one which comprises contacting 21-acetoxy-9α,11β-dichloro-17α-hydroxypregna - 1,4 - diene-3,20-dione with dimethylformamide at a temperature within the range of about 15° C. to about 160° C. and recovering said compound therefrom.

15. A method of preparing 21-acetoxy-3,17α-dihydroxy - 16α - methyl-19-norpregna-1,3,5(10),6,8-pentaen-20-one which comprises contacting 21-acetoxy-9α,11β-dichloro - 17α - hydroxy-16α-methylpregna-1,4-diene-3,20-dione with dimethylformamide at a temperature within the range of about 15° C. to about 160° C. and recovering said compound therefrom.

16. A method of preparing 21-acetoxy-6-trifluoromethyl - 3 - hydroxy-16α,17α-isopropylidenedioxy-19-nor-pregna-1,3,5(10),6,8-pentaen-20-one which comprises contacting 21-acetoxy-9α,11β-dichloro-6α-trifluoromethyl-16α,17α - isopropylidenedioxypregna-1,4-diene-3,20-dione with dimethylformamide at a temperature within the range of about 15° C. to about 160° C. and recovering said compound therefrom.

17. A method of preparing 21-acetoxy-3,17α-dihydroxy - 6-methyl-19-norpregna-1,3,5(10),6,8-pentaen-20-one which comprises contacting 21-acetoxy-9α,11β-dichloro - 17α - hydroxy - 6α-methylpregna-1,4-diene-3,20-dione with dimethylformamide at a temperature within the range of about 15° C. to about 160° C. and recovering said compound therefrom.

18. A method of preparing 6-fluoro-3-hydroxy-19-norpregna-1,3,5(10),6,8-pentaen-20-one which comprises contacting 9α,11β - dichloro - 6α-fluoro-pregna-1,4-diene-3,20-dione with dimethylformamide at a temperature within the range of about 15° C. to about 160° C. and recovering said compound therefrom.

19. A method of preparing 3-hydroxyestra-1,3,5(10), 6,8-pentaen-17-one which comprises contacting 9α,11β-dichloroandrosta-1,4-diene-3,17-dione with dimethylformamide at a temperature within the range of 15° C. to about 160° C. for a period of from about one-half hour to about 72 hours.

20. A method of preparing 3-hydroxyestra-1,3,5(10), 6,8-pentaen-17-one which comprises contacting 9α-bromo-11β-chloroandrosta-1,4-diene-3,17-dione with dimethylformamide at a temperature within the range of 15° C. to about 160° C. for a period of from about one-half hour to about 72 hours.

No references cited.

LEWIS GOTTS, *Primary Examiner.*

UNITED STATES PATENT OFFICE
CERTIFICATE OF CORRECTION

Patent No. 3,274,180                   September 20, 1966

Milton David Heller et al.

It is hereby certified that error appears in the above numbered patent requiring correction and that the said Letters Patent should read as corrected below.

Column 10, line 32, fifth structural formula, strike out "C=H" and insert instead -- C=O --; column 11, line 15, for "3,12-diacetoxy-17α-hydroxy-" read -- 3,21-diacetoxy-17α-hydroxy- --.

Signed and sealed this 22nd day of August 1967.

(SEAL)
Attest:

ERNEST W. SWIDER
Attesting Officer

EDWARD J. BRENNER
Commissioner of Patents